Oct. 30, 1962 — A. G. FITZ GERALD — 3,061,129
BABY NURSERS
Filed Feb. 25, 1957 — 2 Sheets-Sheet 1
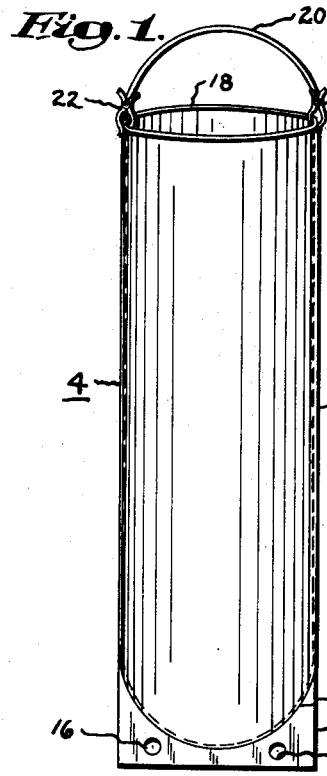
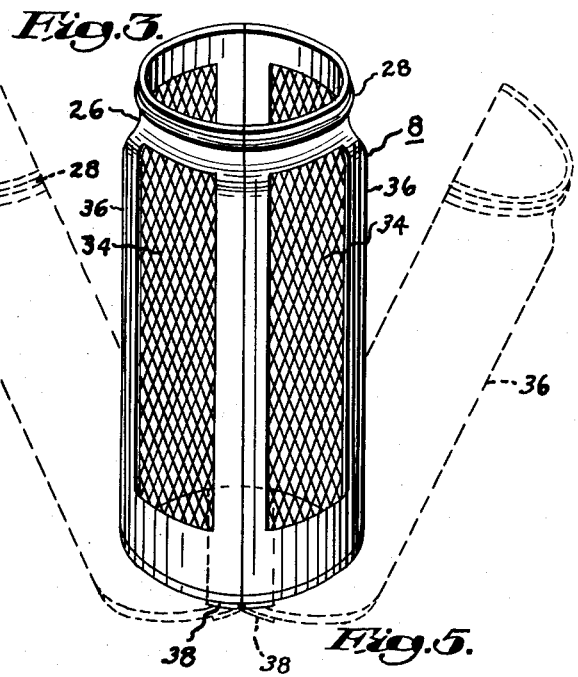
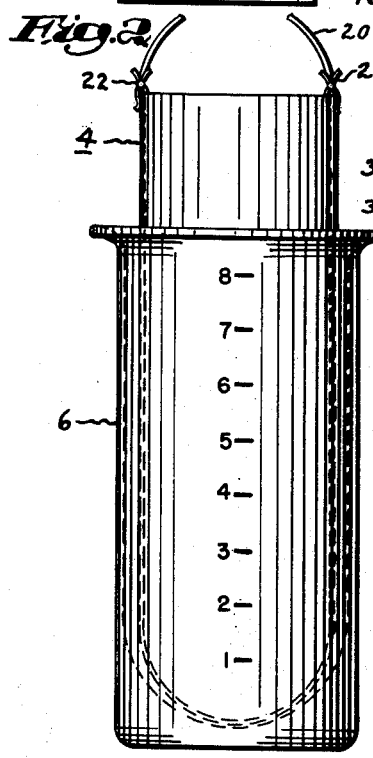
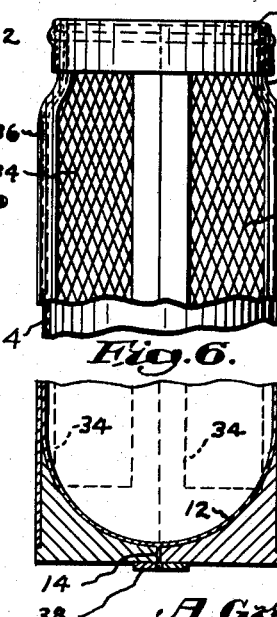
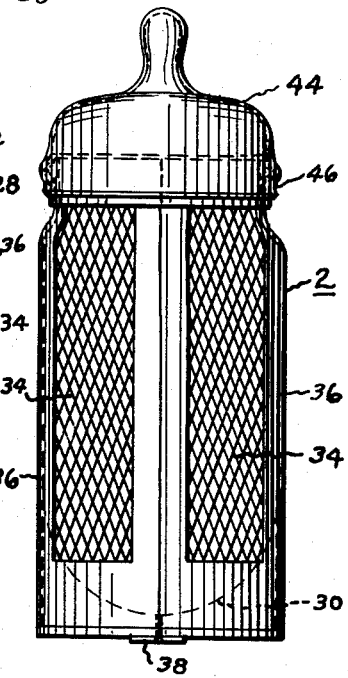
Inventor:
A. Grover FitzGerald,
by Arnold C. Rood
Attorney

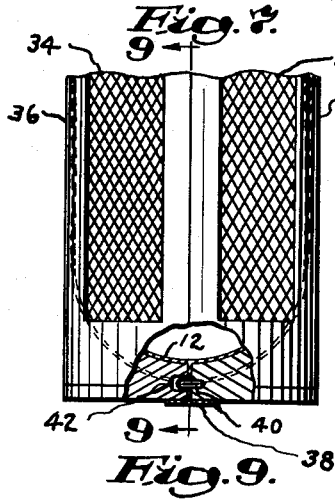
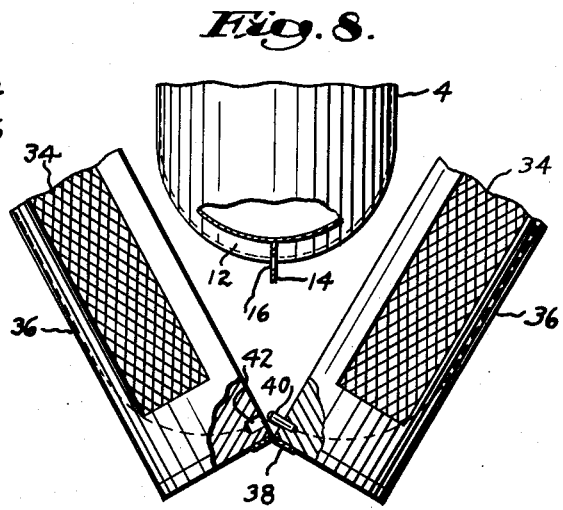
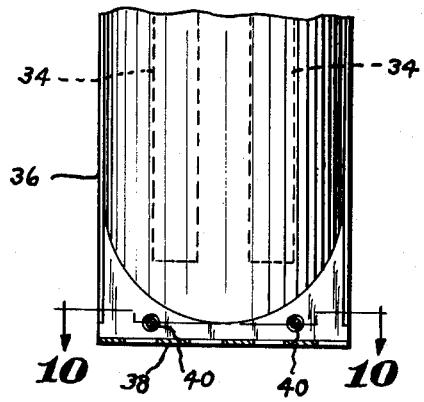
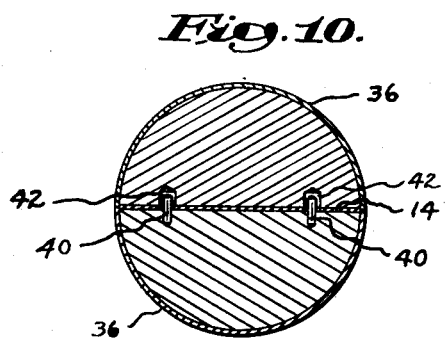
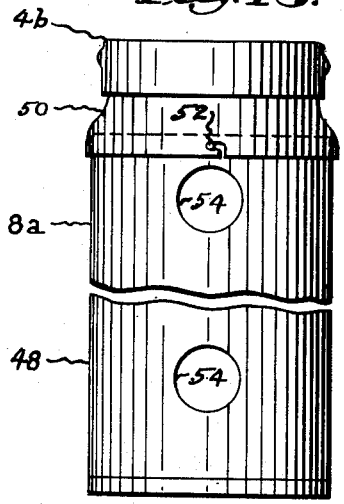
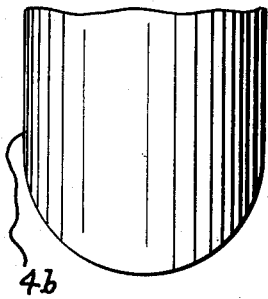
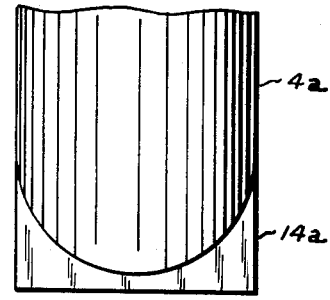

United States Patent Office 3,061,129
Patented Oct. 30, 1962

3,061,129
BABY NURSERS
Arthur Grover FitzGerald, 15 Jackson Road,
Wellesley, Mass.
Filed Feb. 25, 1957, Ser. No. 641,937
4 Claims. (Cl. 215—11)

This invention relates to baby feeders, and more particularly to improved constructions for baby nursers embodying disposable baby food containers.

Objects of the invention are to provide improved baby nursers embodying disposable containers, wherein the constituent parts may be assembled with facility with an easily and definitely measured quantity of baby food in the container, and the food readily fed to the infant. Other objects of the invention will be apparent from the disclosures herein made.

According to the present invention, there is provided a baby nurser embodying a disposable container which may be filled in advance with a predetermined quantity of baby food, and then disposed in a vented holder arranged to accept and hold the filled container.

In the accompanying drawings illustrating specific embodiments of the invention:

FIGURE 1 is a perspective view of an improved form of disposable container having a concave arcuate bottom with a perforated fin;

FIG. 2 is an elevation showing the container disposed in a graduated transparent measuring jar;

FIG. 3 is a perspective view of a hinged vented holder according to this invention showing in dotted lines the holder sections in spaced hinged relation;

FIG. 4 is a fragmentary elevation showing the container disposed within the holder with the upper portion of the container folded over the upper edge of the holder;

FIG. 5 is an elevation of the assembled nurser;

FIG. 6 is a fragmentary vertical section through the lower portion of the assembled nurser;

FIG. 7 is a fragmentary elevation, partly in section, of the lower portion of the nurser embodying the container shown in FIG. 1;

FIG. 8 is a fragmentary elevation, partly in section, of the lower portion of the holder and container in process of assembly;

FIG. 9 is a fragmentary vertical section taken on line 9—9 of FIG. 7;

FIG. 10 is a horizontal section taken on line 10—10 of FIG. 9;

FIG. 11 is a fragmentary elevation of a modified form of container having a concave arcuate bottom portion without a fin;

FIG. 12 is a fragmentary elevation of another modified form of container having an arcuate bottom portion including a nonperforated fin; and FIG. 13 is a fragmentary elevation of a modified form of nurser embodying a vented holder composed of horizontally split sections.

In FIGS. 1 to 10 inclusive, there is shown a specific embodiment of a baby nurser 2 of this invention wherein a container 4 is arranged to be filled with a predetermined quantity of liquid baby food in a measuring jar 6, and the filled container 4 then disposed and held in a vented sectional holder 8. FIGS. 10 and 11 illustrate modified forms of container, and FIG. 13 illustrates a modified form of holder.

The disposable baby food container 4 is desirably composed of flexible, substantially transparent plastic material which is chemically inert to liquid baby food. The plastic material is thin, preferably of the order of a few thousandths of an inch, for example 0.002 inch. An economically desirable material selected from the field of commercially available synthetic plastics is polyethylene, although other suitable materials, composed of synthetic resin or other substances may be employed. The container may be made from material originally formed in tubular shape, from sheet stock, or the container may be molded.

Referring to FIG. 1, polyethylene container 4 has a tubular body portion 10, and a bottom portion which is heat sealed in a concave arc 12 of radius approximating that of tubular portion 10, whereby bulging is precluded when the container is filled. The sealed portion extends downwardly from concave arc 12 to form the fin 14. Fin 14 is perforated at 16 for cooperation with pins in holder 8. The upper edge of container 4 may be beaded, as shown at 18, if desired. In view of the collapsible nature of polyethylene container 4, suitable means such as wire bail 20 having clamps 22 may be employed to support the container during the filling and handling thereof.

In FIG. 2, container 4 is shown as disposed in tubular, transparent, graduated measuring jar 24 for filling purposes. Jar 24 conveniently may be of glass, and has an inside diameter of such dimension as readily to accommodate the container. The interior bottom portion of jar 24 is shaped to conform to the arcuate bottom portion 12 and fin 14 of the container. With the use of measuring jar 6, container 4 readily may be filled with a predetermined, accurately measured amount of baby food. Furthermore, due to the arcuate character of the bottom portion of the container 4, the sides of the container at its lower portion remain straight and free from undesired bulging when the container is filled.

Holder 8 is shown as generally tubular in shape with an inside diameter such that the holder will readily receive a filled container 4. The top or rim portion 26 of the holder is constricted sufficiently that the upper portion of the container 4, when disposed in the holder, may be folded over and outwardly of the top portion 26 and the external bead 28, as shown in FIG. 4. Interiorly, the bottom portion of the holder is arcuately shaped at 30 to conform to the arcuate bottom portion 12 of the container, and is further provided with a slot portion 32 to receive fin 14 of the container. The holder is provided with reticulated panels 34 which serve as lateral venting means to permit atmospheric pressure to be exerted on the exterior of container 4 at all times, and which permit also visual determination of the quantity of baby food remaining in the container during and after baby feeding.

In FIGS. 3 to 10 inclusive, the holder 2 is shown as vertically split into two sections 36 which are hinged at 38 at the bottom of the holder. Pins 40 are carried adjacent to the bottom of one holder section 36 and are arranged to extend through perforations 16 of container fin 14 and into sockets 42 of the other holder section. Pins 40 serve to secure the bottom of the container 4 in fixed position within the holder 8 while permitting lateral collapsing of the container during the feeding operation.

In FIG. 5 is shown a nipple 44 of rubber or rubber-like material the lower portion 46 of which is of such inside diameter that it may be slipped over the folded over portion of container 4 and holder rim bead 28 and held in position by frictional engagement. Holder 8 and its constituent parts may be made of metal, plastic or any other suitable material or of any desired combination of materials.

In using baby nurser 2, the container 4 is first filled with the desired amount of baby food as shown and described with reference to FIG. 2. Hinged holder sections 36 are then separated to a suitable extent in the manner indicated in FIG. 3 and the container 4 disposed within the holder with the pins 40 extending through perforations 16 of the container. The holder sections 36 are then brought together and the top of the container folded over the rim portion 26 of the holder as illustrated in FIG. 4. Then the nipple 44 is applied to the holder with the lower portion 46 of the nipple extending over rim portion 26 and over the already folded over portion of the container, thus firmly securing the upper portion of the container in position within the holder. As previously set forth, the pins 40 serve to hold the lower portion of the container in position. Thus, only lateral collapsing of the container takes place during feeding, and entrapping of any portion of the food within the container is precluded. Furthermore, in view of the vented character of the holder, no valve means is required in the nipple in order to insure a continuous supply of food to the infant.

In FIG. 12 is illustrated container 4a, wherein the fin 14a is not perforated. With this modification, the bottom portion of the container may be held in position in slot 32 by frictional engagement of the adjacent holder parts.

In FIG. 11, container 4b has no fin, in which case the container is not held in engagement at its bottom position.

In FIG. 13, holder 8a is shown as horizontally divided into a tubular lower section 48, and an upper section 50 joined to the lower section 48 by a bayonet joint connection 52. Upper holder section 50 is of reduced diameter to receive the upper folded over portion of container 4b disposed therein. Holder sections 48 and 50 are provided with suitable vent apertures 54.

It will be understood of course that the holder may be split in any desired manner and direction to provide a plurality of holder sections which may be separated and assembled to receive a container already filled with the desired amount of baby food.

It will be seen that by this invention there is provided a simple and economical baby nurser which is highly effective for baby feeding.

It will be understood that various modifications may be made while still coming within the scope of the invention.

Having disclosed my invention, what I claim as new and desire to secure by Letters Patent of the United States is:

1. In a baby nurser, a container and a holder therefor, said container comprising a tubular plastic member sealed at its bottom portion, said bottom portion of the container being formed to provide an integral downwardly extending fin, said holder comprising a pair of laterally vented longitudinally split members detachably secured together and shaped to snugly receive the sides of the container when the container is in filled condition, said holder having a bottom section interiorly shaped to conform to the bottom of said container, said bottom section of the holder having means detachably anchoring the fin thereto, whereby said container is laterally collapsible within said holder as the food within the container is consumed.

2. In a baby nurser, a container and a holder therefor, said container comprising a cylindrical plastic member sealed at its bottom portion in an interiorly concave arc of radius approximating that of said cylindrical member, said holder being vented and comprising a plurality of sections which may be joined to enclose the body of said container with the upper portion of said container therewithin extending beyond the upper edge of said holder, said holder having a top section smaller in periphery than that of the container and having a bottom section interiorly arcuately shaped to conform to the bottom of said container.

3. A baby nurser comprising, in combination, a container composed of cylindrical plastic, the lower portion of which is sealed in an interiorly concave arc of substantially the same radius as said cylindrical portion, said bottom portion of the container being formed to provide a downwardly extending fin, a holder for said container comprising a pair of laterally vented longitudinally split members hinged together at their lower sections, said holder members being shaped to receive said container in filled condition and to anchor the lower fin portion thereof therewithin, said holder having an upper peripheral rim section smaller in circumference than that of the container to receive the upper outwardly turned down portion of said container and having a bottom section interiorly arcuately shaped to conform to the bottom of said container, and a nipple member of elastic material receivable by said portion of the holder sections over the turned down portion of the container, said container being laterally collapsible within said holder as the food within the container is consumed by reason of the anchorage of the lower portion of the container.

4. A baby nurser comprising, in combination, a container composed of tubular plastic, the bottom portion of which is sealed, said bottom portion of the container being formed to provide a downwardly extending fin, a holder for said container comprising a pair of laterally vented longitudinally split members hinged together at their lower sections, said holder members being shaped to receive said container in filled condition and to anchor the lower fin portion thereof therewithin, said holder having an upper peripheral rim section smaller in circumference than that of the container to receive the upper outwardly turned down portion of said container and having a bottom section interiorly shaped to receive the bottom of said container, and a nipple member of elastic material receivable by said portion of the holder sections over the turned down portion of the container, said container being laterally collapsible within said holder as the food within the container is consumed by reason of the anchorage of the lower portion of the container.

References Cited in the file of this patent

UNITED STATES PATENTS

| | | |
|---|---|---|
| 985,328 | Decker | Feb. 28, 1911 |
| 1,106,927 | Decker | Aug. 11, 1914 |
| 1,344,760 | Goddard | June 29, 1920 |
| 1,452,039 | Gravell | Apr. 17, 1923 |
| 1,695,076 | Zohe | Dec. 11, 1928 |
| 2,624,485 | Boston | Jan. 6, 1953 |
| 2,628,913 | Horan | Feb. 17, 1953 |
| 2,826,324 | Hoag | Mar. 11, 1958 |
| 2,859,891 | Carkin | Nov. 11, 1958 |
| 2,885,104 | Greenspan | May 5, 1959 |

FOREIGN PATENTS

| | | |
|---|---|---|
| 124,023 | Switzerland | Feb. 2, 1927 |